United States Patent
Caruso et al.

(10) Patent No.: US 6,574,585 B2
(45) Date of Patent: Jun. 3, 2003

(54) METHOD FOR IMPROVING ROBUSTNESS OF WEIGHTED ESTIMATES IN A STATISTICAL SURVEY ANALYSIS

(75) Inventors: Joe Caruso, Staatsburg, NY (US); Aliza R. Heching, Bronx, NY (US); Ramesh Inaganti, Carmichael, CA (US); Ying Tat Leung, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 09/791,654

(22) Filed: Feb. 26, 2001

(65) Prior Publication Data

US 2002/0156596 A1 Oct. 24, 2002

(51) Int. Cl.[7] .............................................. G06F 17/18
(52) U.S. Cl. ...................................... 702/179; 702/181
(58) Field of Search .......................... 702/81, 84, 179, 702/181, 182; 705/7, 10, 11

(56) References Cited

U.S. PATENT DOCUMENTS 5,740,035 A * 4/1998 Cohen et al. ................. 705/10
6,397,166 B1 * 5/2002 Leung et al. ............... 702/179

OTHER PUBLICATIONS

Bernard Rosner "Percentage Points for a Generalizeol ESD Many–Outlier Procedure", May 1983; Technometrics, vol. 25, No. 2 ; pp. 165–172.*

Newbold et al., "Statistics for Business and Economics," Some Other Graphical Methods, pp. 59–60.

B. Rosner, "Percentage Points for a Generalized ESD ManyOutlier Procedure", Technometrics, vol. 25, No. 2 May 1983, pp. 165–172.

Barnett, et al., "Outliers in Statistical Data", pp. 226–230 and 494 and 498.

Hoaglin et al., "Fine–Tuning Some Resistant Rules for Outlier Labeling", Journal of the American Statistical Association, Dec., 1987, pp. 1147–1149.

Dixon, et al., "Ratios Involving Extreme Values," The Annals of Mathematical Statistics, vol. 22, 1951, pp. 68–78.

* cited by examiner

Primary Examiner—Bryan Bui
(74) Attorney, Agent, or Firm—Whitham, Curtis & Christofferson, P.C.; Stephen C. Kaufman

(57) ABSTRACT

A computer method improves the robustness of population parameters estimated using sample responses. Two different factors that may impact the accuracy of estimates are considered. The first factor is referred to as statistical outliers. By statistical outliers, what is meant is observations that fall "statistically outside" of the other remaining observations in the sample. The second factor considered is the impact of the weight assigned to each observation on the overall parameter estimate. More specifically, the fact that weights assigned to each respondent are typically estimated and thus not exact is addressed. Consequently, the weights do not unduly influence the value of the parameter estimates.

11 Claims, 4 Drawing Sheets

METHOD FOR IMPROVING ROBUSTNESS OF WEIGHTED ESTIMATES IN A STATISTICAL SURVEY ANALYSIS

BACKGROUND OF THE INVENTION

1. Field of the Invention

The present invention generally relates to methods of statistical analysis, and more particularly to a method for improving the accuracy of weighted population parameters estimates computed based on responses from a sample population to a survey.

2. Background Description

Surveys are conducted to gather information which will allow an individual or corporation to make an informed decision. Many times, the information is used to gain an understanding of the beliefs and behaviors of a target population under a given set of circumstances. Responses to the survey questions, thus, provide a "snapshot in time" which reflects these current beliefs and behaviors.

The analysis of survey response data is particularly important in providing business services. Typically, businesses conduct surveys to determine the needs of their customers, and the underlying conditions which make their services desirable. This information is then used as a guide for improving the products or services or for offering new products or services. Surveys have also been used to capture public response to promotional messages from businesses, agencies, governments, and institutions.

Generally, it is difficult and costly to survey every member of a target population, i.e., to conduct a census. Therefore, polling organizations usually survey a subset (i.e., a representative sampling) of the population. Inferences about the beliefs or behaviors of the population are then drawn based on responses from the subset. To draw inferences about the population based on survey responses, a two-step approach is usually taken. First, a selection process or sampling methodology is used which dictates the rules by which members of the population are included in the sample. Second, an estimation process is performed to compute sample statistics which include sample estimates of population parameters.

In many cases, it is difficult to obtain a large sample of a target population. The inability to obtain a sufficiently large sample potentially translates as inaccuracies in the parameter estimates. The challenge faced by survey statisticians, therefore, is to determine how to use the limited sample data gathered to make accurate statements about the population.

Known methods for improving precision of survey estimates are limited in scope. One such method includes detecting and eliminating statistical outliers in the sample data. This serves to correct for possible errors in data collection and recording. Eliminating statistical outliers will also reduce the impact of any "abnormal" observations, i.e., members of the sample whose actions or beliefs do not accurately reflect overall population actions or beliefs.

Another potential source of inaccuracies in parameter estimates lies in the way in which observations are often weighted by the survey statistician. Often, a statistician will place more emphasis on the responses of some of the sample elements than others. This emphasis is realized by assigning weights of different values to the different sample responses. The weights, however, are generally estimated values, not computed according to some known and fixed rules. Consequently, inaccuracies can arise from poor estimates.

From the foregoing discussion, it is clear that there is a need for a method of performing a statistical survey analysis which generates more robust estimates of population parameters compared with conventional methods, and more particularly one where the more robust estimates are used to draw comparatively more accurate and reliable inferences of belief, behaviors, and/or trends engaged of the entire population.

SUMMARY OF THE INVENTION

It is an object of the present invention to provide a method for performing a statistical survey analysis which is more accurate and reliable than conventional methods.

It is another object of the present invention to achieve the aforementioned object by generating robust estimates of population parameters, which estimates are then used as a basis for drawing inferences relating to beliefs, behaviors, and/or trends of the population as a whole.

These and other objectives of the present invention are achieved by providing a method for analyzing statistical data which generates robust population parameters by reducing or eliminating inaccuracies caused by at least one of two factors. The first factor is statistical outliers, defined as observations that fall statistically outside of other observations in the sample. The second factor focuses on the impact of estimated weights assigned to observations relating to population parameter estimates. Both factors are undesirable because they tend to skew the accuracy of the population parameter estimates and thus the results of the survey analysis as a whole. The method of the present invention advantageously addresses both factors by (i) identifying and then eliminating statistical outliers, (ii) dampening the impact of the assigned weights so that any single weighted observed value does not unduly influence the value of the overall population parameter estimates, or (iii) both.

In accordance with a first embodiment, the method of the present invention includes identifying a survey question, obtaining a sample from a target population, collecting responses to the survey question from respondents in the sample, assigning weight values to observations corresponding to the responses, and developing a heuristic which reduces skew of an estimate of a population parameter caused by the assigned weight values by adjusting the values of the weights. An estimate of the population parameter is then computed using the adjusted weights, which estimate is a more accurate and robust estimate because the impact of the inaccuracies of the assigned weights values have been reduced or eliminated.

In accordance with a second embodiment, the method of the present invention includes identifying a survey question, obtaining a sample from a target population, collecting responses to the survey question from respondents in the sample; identifying at least one statistical outlier which may skew an estimate of a population parameter of the survey, eliminating the statistical outlier, and computing the population parameter with the statistical outlier eliminated.

In accordance with a third embodiment, the method of the present invention includes identifying a survey question, obtaining a sample from a target population, collecting sample responses to the survey question from respondents in the sample, assigning weights to observations corresponding to the responses, computing at least one population parameter estimate in accordance with steps that include a) identifying and then eliminating at least one statistical outlier which may skew the at least one population parameter estimate, and b) dampening an impact of at least one of the assigned weights on a value of the at least one population parameter estimate.

Through the embodiments of the present invention, accurate, robust population parameter estimates are obtained by eliminating statistical outliers, and/or adjusting weights assigned to each response, within a user specified range, using a heuristic such that no observation will have an unduly large impact on the overall population parameter estimate. By taking one or both of these approaches, a statistical basis is prepared from which a more accurate determination or forecast of the target population trends and behavior is obtained.

DETAILED DESCRIPTION OF A PREFERRED EMBODIMENT OF THE INVENTION

Figure 1:
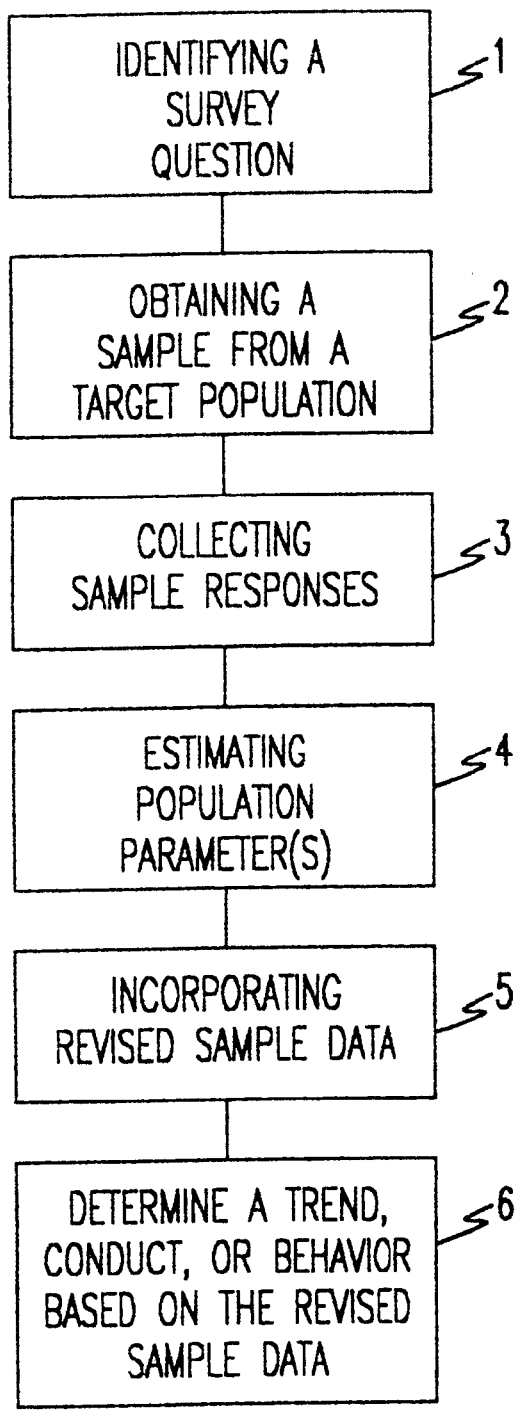
FIG. 1 is a flow diagram showing steps included in an embodiment of the method of the present invention

The present invention is a computer-implemented method for improving the robustness of weighted estimates in a statistical survey analysis. Referring to FIG. 1, an initial step of the method includes obtaining or designing a survey containing one or more questions which relate to a particular topic of interest. (Block 1). Preferably, the questions in the survey are drafted to elicit, with the greatest possible likelihood, information which statisticians ultimately want to acquire.

A second step includes obtaining a sample (e.g., a subset of members) from a target population. (Block 2). This step may be performed by implementing any one of a number of known sampling techniques, which may include probability sampling and non-probability sampling.

Probability sampling techniques include:

Simple random sampling: all members of population have equal probability of being selected. (In this case, if the size of the population is N and the sample size is n, then a member of the population has probability n/N of being selected as element of the sample.)

Systematic sampling: each member of the population is listed, a random start is designated, and then members of the population are selected at equal intervals.

Stratified sampling: each member of the population is assigned to a stratum. Simple random sampling is used to select within each stratum. This method of sampling is often used as a means for reducing the variance of the population parameter estimates. One stratifies, for example, so that respondents with similar characteristics are classified into the same stratum. Then, the estimated population mean (discussed below) for that stratum will have a lower variance. This will result in overall estimated population mean with lower variance.

Cluster sampling: each member of the population is assigned to a cluster. Clusters are selected at random and then all members of the cluster are included in the sample.

Multi-stage sampling: clusters are selected as in the cluster sampling. Then sample members are selected from within each cluster, using simple random sampling. The probability sampling techniques outlined above are merely illustrative of the present invention. Those skilled in the art can appreciate that other probability sampling techniques may also be used if desired.

Non-probability sampling techniques include convenience sampling (select a sample based upon availability for the study), most similar/dissimilar cases sampling (select cases that are judged to be similar or dissimilar, depending upon researchers objective), typical cases (select cases that are known a priori to be useful and representative), critical cases (select cases that are essential for inclusion in and acceptance of study results), snowball sampling (current members of sample identify additional cases), and quota (interviewer selects sample that yields same proportions as population proportions on some specific variables).

It is noted that probability sampling is preferred over non-probability sampling in that its results are more valid and credible. On the other hand, it often takes longer and more effort to put together a probability sample. With probability sampling, different techniques are used for different situations. For example, cluster sampling is often used if the population is segmented into natural clusters (e.g., schools or households), and stratification may be used to decrease the variances of the sample estimates. While probability sampling techniques are preferred, if desired non-probability sampling may be used to perform the first step of the present invention.

If stratified sampling is used to perform the initial step of the invention, each member of the population is assigned to a stratum. Simple random sampling is used to select within each stratum. This method of sampling is often used as a means for reducing the variance of the population parameter estimates. One stratifies, for example, so that respondents with similar characteristics are classified into the same stratum. Then, the estimated population parameter for that stratum will have a lower variance. This will result in overall estimated population parameter with lower variance, as described in greater detail below.

A third step includes collecting responses to the survey question(s) from the respondents in the sample, and then recording them in a database or other computer-based storage device. (Block 3).

A fourth step includes estimating one or more relevant population parameters based on the survey responses. (Block 4). This step involves estimating the population parameters in a way which (i) identifies and then eliminates statistical outliers which may skew the population parameter estimate(s), (ii) dampens the impact of at least one assigned weight on a value of an observation on the population parameter estimate(s), or (iii) both. Two exemplary population parameters are population mean and population ratios. Those skilled in the art can appreciate that other parameters may also be estimated in accordance with the present invention.

A fifth step is performed after statistical outliers have been eliminated and weights have been dampened or adjusted to reduce their impact on the population parameter estimate(s). In this step, more robust estimates of the population parameters are generated by incorporating the revised sample data, adjusted in the sense that outliers have been eliminated and an adjusted set of weights are incorporated into the formula used to compute the estimate of the population parameter. (Block 5).

The revised sample data may be incorporated to compute the estimates by replacing the initial sample data set with its associated weights with the revised sample data. The revised sample data may have fewer observations (if some observations were deemed outliers) and may have different associated weights (if the heuristic adjusted some weights). The revised sample data may be treated as if it is the initial sample data in terms of using it form population parameter estimates. (Here, "revised sample estimate" means the following: using the original sample data and associated weights, one generates/computes some estimate for population parameters. By using the revised sample data (outliers eliminated and weights adjusted), one gets a different estimate for population parameters. This is the "revised sample estimate." The steps and formulas used to compute population parameter estimates are described supra in connection with an example where stratified sampling was performed.)

By computing estimates of population parameters, one is able to make statements about the entire population at large, rather than statements regarding the members of the specific sample collected. These statements may be in the form of conclusions which relate to trends, behaviors, or conduct which the overall target population may have. (Block 6).

The estimates of population parameters computed in accordance with the present invention are more robust than conventionally known. These estimates may advantageously be used to make more accurate statements about the entire population at large. For example, a sample of (e.g., 5) individuals are asked the question: what is your average annual income? The following responses may be obtained: $100,000, 185,000, 86,000, 145,000, and 1,450,000.

Now, we want to make some statement about the average annual income for the population. We do not, however, want to take just the average of these five values (e.g., 393,200) and say that the average annual income of the population is this number, because this is just the average for this specific sample of 5 individuals. If five other individuals from the target population are sample, an entirely different average may result using this approach. It is also noted that the value of $1,450,000 is radically different from the other 4 values. Perhaps, this value is an outlier. Or, perhaps, there was a typographical error and an extra zero was added, so that the value should really have been $145,000.

In implementing the present invention, the sample responses would be tested for statistical outliers, and the value of $1,450,000 would be determined to be one of them. This outlier would therefore be eliminated and only the four other responses would be used to estimate the population average annual income. It is therefore readily apparent that the method of the present invention produces a far more accurate population parameter estimate than conventional techniques, which in turn leads to a more accurate determination of trends, behaviors, and/or conduct of the target population a whole.

The fourth step of the method of the present invention will now be discussed in greater detail. The fourth step involves computing population parameter estimates in a way that reduces or altogether eliminates inaccuracies introduced by one of two factors or both of them depending upon the embodiment. The first factor is what is referred to as statistical outliers, which may be defined as observations that fall "statistically outside" of the other remaining observations in the sample. For improved understanding of the invention, "observations" means the observed variable values for the members of the sample. (As will be described in greater detail below, the step of assigning a weight to an observation involves assigning a weight to the observed value for each member of the sample.)

The term "population parameter" means different descriptive measures about the population that may interest the entity conducting the survey. For example, one may be interested in the population mean (e.g., the mean population gross income) or a population ratio (e.g., the proportion of men who prefer Bush over Gore).

The term "outliers" means observed values that are statistically significantly different from the remaining observed values. To illustrate, if 100 members of a population are sampled, we will check if, for example, observed value for member 1 is an outlier by comparing its observed value to the remaining 99 observed values.

The second factor is the impact of a weight assigned to each observation on an overall parameter estimate. In considering this factor, it is recognized that weights assigned to each respondent are typically estimated and thus not exact. The method of the present invention ensures that the weights do not unduly influence the value of the population parameter estimates. The manner in which weights may be assigned in accordance with the present invention is described in co-pending application Ser. No. 09/739,637, the contents of which are herein incorporated by reference. The method of the present invention is described below taking these factors into consideration.

Statistical Outliers

By way of example, if stratified sampling was used to obtain the sample responses, the fourth step of the method of the present invention may include searching for statistical outliers separately within each stratum. The reason for taking this approach is that populations are generally stratified so that observations within any stratum are similar.

In performing this search, it is difficult to determine with certainty whether or not an observation is an outlier. Statisticians have devised several methods for detecting outliers. First, some assumption is made about the distribution of the data from which the sample was collected. Then, one will quantify how far the suspected outlier is from the other values. This may be computed in different ways, including computing the difference between the value of the suspected outlier and the mean of all points, the difference between the value of the suspected outlier and the mean of the remaining values, or the difference between the value of the suspected outlier and the next closest value. (This distance value may be a value of a suspected outlier—mean of all points, a value of a suspected outlier—mean of the remaining points, or a value of a suspected outlier and the next closest value.)

Next, this distance value is standardized by dividing by some measure of scatter, such as the standard deviation of all values, the standard deviation of the remaining values, or the range of the data.

Finally, the probability associated with the answer to the following question is computed: If all the values were really sampled from the assumed distribution for the population, what is the probability of randomly obtaining an outlier so far from the other values? If the probability is small, it is concluded that the deviation of the outlier from the other values is statistically significant.

Figure 2:
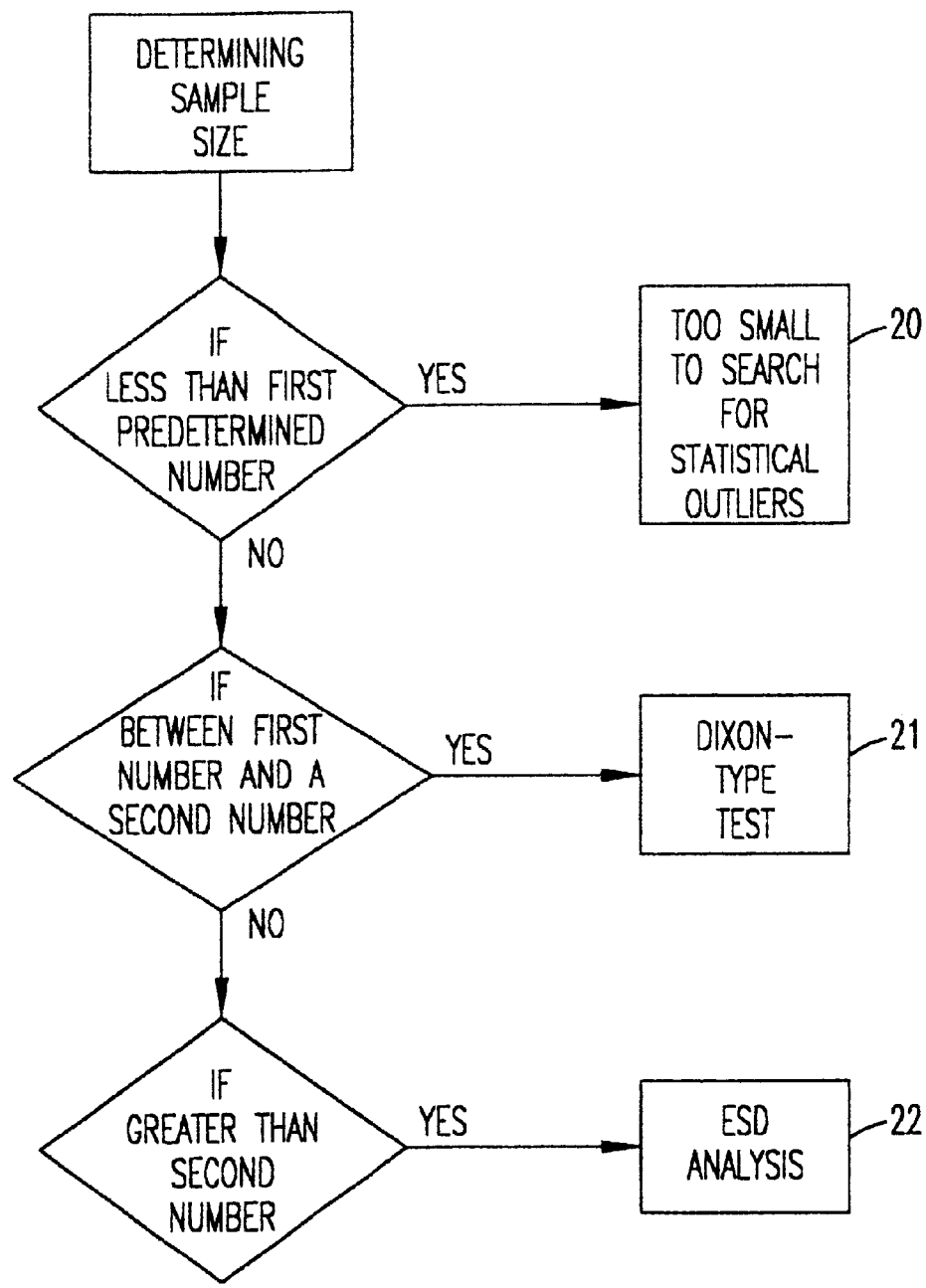
FIG. 2 is a flow diagram showing how at least one embodiment of the invention searches for statistical outliers.

If non-stratified sampling is employed, we search for statistical outliers once for the entire sample. Different methods may be used to detect statistical outliers. The choice of method depends upon the number of observations in the sample (or stratum). The following rules may be followed, as shown in FIG. 2:

1. If the sample size is smaller than a first predetermined number (e.g., 4), this sample is deemed to be too small to conduct a valid search for outliers. (Block 20).
2. If the sample size is between the first predetermined number (4) and a second predetermined number (e.g., 10), the so-called Dixon-type test may be used to detect outliers. (Block 21).
3. If the sample size is greater than the second predetermined number (10), a generalized Extreme Studentized Deviate (g-ESD) procedure may be used to identify the outliers. (Block 22).

A generalized ESD procedure applicable to the method of the present invention is disclosed, for example, in Rosner, "Percentage points for a Generalized ESD Many-Outlier Procedure," Technometrics, 25, 165–172, (1983), the contents of which are incorporated herein by reference. Those skilled in the art can appreciate that the first and second predetermined numbers mentioned above are merely illustrative of the invention, as numbers other than 4 and 10 may also be used to achieve the objectives of the present invention.

Taking these rules in seriatim, when the sample size is between four and ten, a Dixon-type test may be employed to search for at most two outliers. A Dixon-type test that may be used in accordance with the present invention is disclosed, for example, in Dixon, W. J. (1951) "Ratios Involving Extreme Values," Annals of Mathematical Statistics, 22, 68–78, and Barnett, V. and T. Lewis (1994), "Outliers in Statistical Data," New York, John Wiley and Sons.

In applying the Dixon-type test, observations are first ordered in increasing order. Then, a search is performed for 1) a single outlier on the right, 2) a single outlier on the left, 3) two outliers on the right, and 4) two outliers on the left. (The terms "right" and "left" mean the following: If all observations are ordered in increasing order, then the observations with lowest value will be on the left side, and the values of the observations will increase as one goes from left to right. So an outlier on the left means to test if the observation with the lowest value is an outlier; an outlier on the right means to test if the observation with the highest value is an outlier.)

In performing the search, the Dixon-type test requires some guess to be made of the number and location (right or left) of suspected outliers in the data. One option is to first use a boxplot technique to locate suspected outliers, and then use the Dixon-type test to test these outliers. Several boxplot techniques are known. The standard boxplot, disclosed, for example, in Newbold, P. (1995), "Statistics for Business and Economics," (New Jersey, Prentice Hall), has a higher chance of detecting false outliers than typical tests. (A "false outlier" means that the test says that the observation is an outlier, but really it is not.) A known variation of the standard boxplot slightly modifies the standard test to ensure that a random normal sample has a pre-specified probability of containing no outliers. See, for example, Hoaglin and Iglewicz, (1987), "Fine-Tuning Some Resistant Rules for Outlier Labeling," Journal of the American Statistical Association, 82, 1147–1149. Either type of boxplot technique may be used in accordance with the present invention to guess which observations are potential outliers, and then a Dixon-type test may be used to test if these observations are, in fact, outliers.

As mentioned previously, Dixon-type tests work with ordered samples (in increasing order of magnitude), wherein (1) all observations are ordered in this manner and labeled as $x(1), x(2), \ldots, x(n_h)$, and (2) the significance level, $\alpha_i$ for the test is specified. The following steps are then performed.

Test for a Single Outlier. For an outlier on the right, $x(n)$ is an outlier if:

$$r_{11} = \frac{x_{(n)} - x_{(n-1)}}{x_{(n)} - x_{(2)}} > \lambda_{11}$$

For the outlier on the left, the negative is taken of all observations. Then, a Dixon-type test is performed as above.

Test for Two Outliers (on a Single Side). For two outliers on the right, $x_{(n)}$ and $x_{(n-1)}$ are outliers if:

$$r_{21} = \frac{x_{(n)} - x_{(n-2)}}{x_{(n)} - x_{(2)}} > \lambda_{21}$$

For two outliers on the left, the negative is taken of all observations, and then the test above is performed.

As previously stated, a Dixon-type test requires an a priori "guess" of the number and location of suspected outliers. One can first use the boxplot rule to help identify potential outliers. The boxplot rule works as follows. First, order the observations in increasing order. Second, define the lower quartile, $Q_1$, as $Q_1 = x_{(f)}$. The $f^{th}$ ordered observation, f, is defined as:

$$f = \frac{\left\lfloor \frac{(n+1)}{2} \right\rfloor + 1}{2}$$

where "$\lfloor \ \rfloor$" denotes the "floor," i.e., the largest integer whose value is less than or equal to $$\frac{(n+1)}{2},$$

where n is the number of observations. If f involves a fraction, Q is the average of $x_{[f]}$ and $x_{[f+1]}$. Also, values for $\lambda_{11}$ and $\lambda_{21}$ are computed using the table in Dixon, W. J. (1951), "Ratios Involving Extreme Values," Annals of Mathematical Statistics, 22 68–78, where values for $\lambda_{11}$ and $\lambda_{21}$ are listed for different $\alpha_i$ and different values of n.

Third, define the upper quartile, $Q_3$, in a similar manner. Specifically, count f observations from the top. Thus, $Q_3 = x_{(n+1-f)}$.

Fourth, define the inter-quartile range, $k_F$, as $R_F = Q_3 - Q_1$.

Finally, potential outliers are those observations that either (a) lie above $Q_3 + 1.5 \ R_F$ or (b) lie below $Q_3 - 1.5 \ R_F$. Once the location of the potential outliers have been identified, the Dixon-type test discussed above may be applied to determine if these observations are, in fact, outliers.

When the sample size is greater than ten, a generalized ESD procedure may be used to identify the outliers. Generalized ESD includes the following steps. First, pre-specify m (the maximum possible number of outliers) as being a parameter defined by the user. Second, specify the significance level for the test, $\alpha_1$. Third, compute the following:

$$R_1 = \max_{i \leq n}\left( \frac{|x_i - \bar{x}|}{s} \right).$$

Then, find and remove the observation which maximizes this term.

Fourth, compute $R_2$ in the same way, except that for $R_2$ the sample size n−1 is used by removing the observation identified by $R_1$.

Fifth, compute $R_3, \ldots, R_m$ in a similar manner (with sample sizes n−2, n−3, . . . , n−m+1).

Sixth, assume $\lambda_i$ is known, outlier identification works as follows. If all of the $R_i \leq \lambda_i$, then no outliers exist. But, if some $R_i > \lambda_i$, then let l=max $\{i: R_i > \lambda_i\}$ and declare $x^{(o)}, \ldots, x^{(l-1)}$ as outliers. (Here, $x^{(o)}, \ldots, x^{(l-1)}$ are the observations selected in iterations 1 though l of this algorithm.) The parameter $\lambda_1$ may be computed as follows.

1. The table in Rosner, "Percentage points for a Generalized ESD Many-Outlier Procedure," Technometrics, 25, 165–172, (1983), lists the values of $\lambda_i$ for different values of $\alpha_1$ and different values of n, the total number of observations in the sample.

2. For values not in the table, the following formula can be used:

$$\lambda_i = \frac{t_{n-i-1,p}(n-i)}{\sqrt{(n-i-1+t^2_{n-i-1,p})(n-i+1)}}$$

where i $\in$[i,m], $t_{v,p}$ is 100 p percentage points from t distribution with v degrees of freedom, and $$p = 1 - \left[\frac{\alpha}{\alpha(n-i+1)}\right]$$

and parameters m, $\alpha$.

In summary, the steps of generalized ESD are:
1. Specify m, maximum number of possible outliers.
2. Compute $R_1, \ldots, R_m$ where $$R_i = \max_{s \in S}\left\{\frac{(x_s - \bar{x}_i)}{s_i}\right\}.$$

3. Compute $\lambda_1, \ldots \lambda_m$.
4. Find the maximum i=1, . . . , m for which $R_i > \lambda_i$. Let k=max $\{i: R_i > \lambda_i\}$. Then, $x_1, \ldots, x$ are outliers.

Weighted Analysis

The method of the present invention may include performing a weighted analysis to compute estimates of the population parameter(s). Weighted analysis involves assigning a weight to each observation in the sample. These weights are then incorporated in the computations of the overall population parameter estimates. When the weights themselves are inaccurate, they negatively impact the accuracy of the overall population parameter estimate. In accordance with one embodiment, the method of the present invention may advantageously be performed to reduce or altogether eliminate the potential inaccuracies introduced by these estimated weights on the population parameter estimates.

Figure 3:
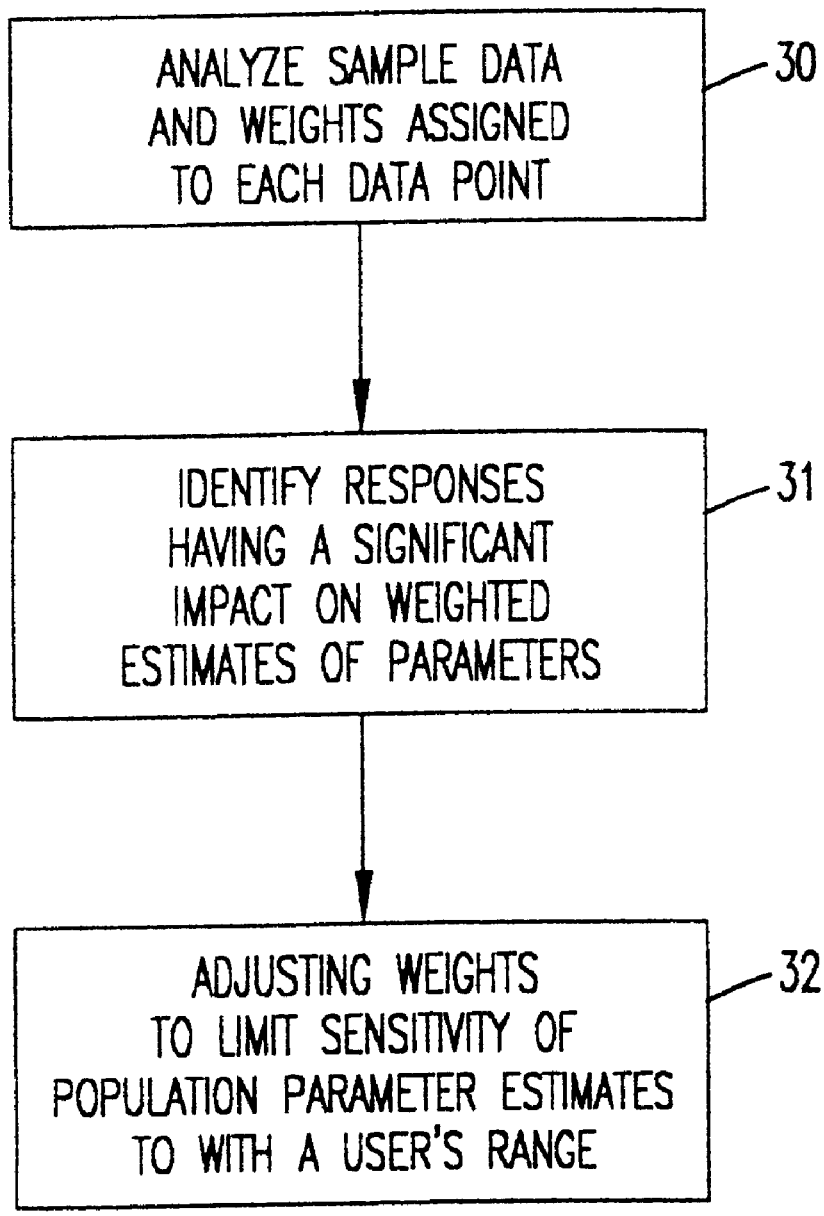
FIG. 3 is a flow diagram showing steps for reducing inaccuracies introduced into population parameter estimates from estimated weight values, which steps are based on the application of a heuristic developed in accordance with at least one embodiment of the present invention.

More specifically, during a weighted analysis the weights assigned are often estimated and hence are inexact. The invention focuses on preventing the value of these weights from unduly influencing the accuracy of the population parameter estimates. Referring to FIG. 3, the invention compensates for these inaccuracies by developing a heuristic which analyzes the sample data and weights associated with each data point (Block 30), and identifies responses that have a significant impact upon the weighted estimate of the population parameter, e.g., population mean. (Block 31). These weights are then adjusted, within a user specified range, to limit the sensitivity of the estimate of the population parameter to the weights assigned to each response. (Block 32). The goal is to have the population parameter estimates reflect the weights, but the exact combined value of any observation and its associated weight should not heavily influence the final parameter estimate.

Figure 4:
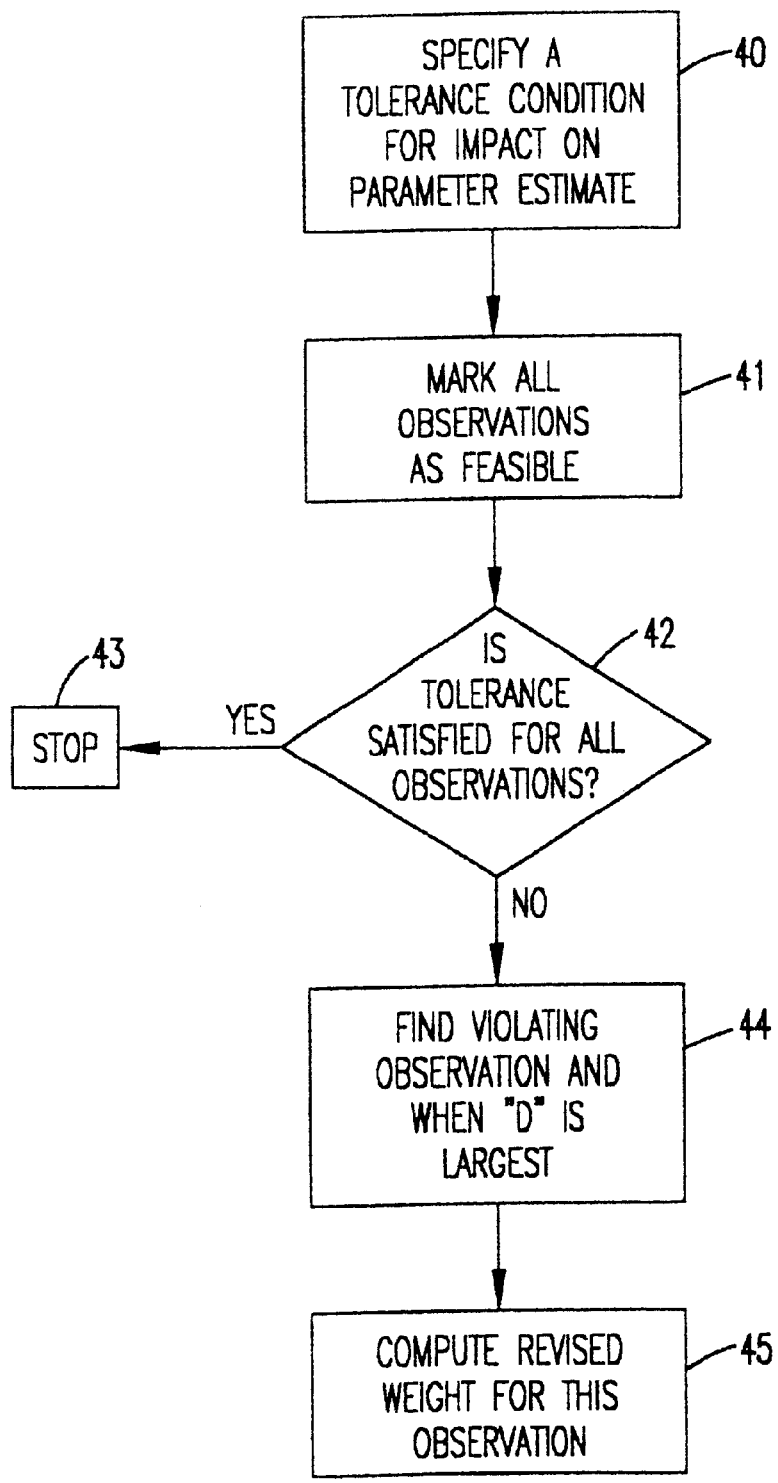
FIG. 4 is a flow diagram showing steps used to develop the heuristic of the present invention.

The heuristic developed in accordance with the present invention works as follows. Referring to FIG. 4, first, a user specifies a tolerance level for impact of any observation on final parameter estimate. (Block 40). A variety of criteria may be used to guide a user in selecting a tolerance level. The user, for example, may wish to consider different values for T (e.g., increase T from T (under bar) to $\bar{T}$ in some specified increments) and then chart the impact of this T value on (1) the revised estimate of the population parameter and (2) the number of weights that the heuristic modifies. The user can then select a value for T (under bar)$\leq T \leq \bar{T}$ with which the user feels comfortable. D (defined below) measures the impact of any single weighted observation on the total population parameter estimate. The goal of this heuristic is to ensure that no single observation has an unduly large impact. The comfort level is discretionary to the user.

For a user-specified tolerance level T, we say that an observation k is within this tolerance level if D=

$$D = \left|\frac{\bar{y} - \bar{y}_k}{\bar{y}}\right| < T,$$

where $\bar{y}$ is the population parameter estimate based upon the current weights and observed values and $\bar{y}_k$ is the population parameter estimate based upon the current weights and observed values excluding observation k. The condition D<T is referred to as the Tolerance Condition.

Second, mark all observations as feasible. (Block 41).

Third, for each feasible observation, check whether the Tolerance Condition is satisfied. Two conditions may occur. (Block 42). If the Tolerance Condition is satisfied for all observations, then stop. (Block 43). If the Tolerance Condition is not satisfied for all observations, perform the following steps.

Fourth, find the observation that violates the Tolerance Condition and for which D is largest. Denote this observation as observation $k_0$. For this observation $k_0$, compute a revised weight, $w_{k_0}$, according to the following steps. (Block 45).

We specify revised weight $w_{k_0}$ such that the following equation is satisfied:

$$\frac{\bar{y} - \bar{y}_{-k_0}}{\bar{y}} = T$$

Thus, we are finding a revised weight for observation $k_0$ for which the Tolerance Condition is exactly satisfied. As an example, if $\bar{y}$ represents an estimate of the population mean for variable y, and the sample was selected by way of stratified sampling, then:

$$\bar{y} = \frac{\sum_{h=1}^{H} \frac{N_h}{n_h} \sum_{k \in h} w_k y_k}{\sum_{h=1}^{H} \frac{N_h}{n_h} \sum_{k \in h} w_k}$$

where
H=the number of strata
$N_h$=the population size of the population in stratum h
$n_h$=the size of the sample in stratum h
$y_k$=the value of the variable for observation k
$w_k$=the weight assigned value of the variable for observation k
and $$\bar{y}_{-k_0} = \frac{\sum_{h=1}^{H} \frac{N_h}{n_h} \sum_{k/k_0 \in h} w_k y_k}{\sum_{h=1}^{H} \frac{N_h}{n_h} \sum_{k/k_0 \in h} w_k}$$

where $h_0$=the stratum containing observation $k_0$ and $k/k_0 \in h$ denotes all observations in stratum h excluding observations $k_0$.

Then, the revised weight for observation $k_0$, $w_{k_0}$, is computed as follows:

$$\frac{\bar{y} - \bar{y}_{-k_0}}{\bar{y}} = T$$

resulting in the following:

$$w_{k_0} = \frac{C \cdot \left( \sum_{h/h_0} \frac{N_h}{n_h} \sum_{k \in h} w_k + \frac{N_{h_0}}{n_{h_0}} \sum_{k/k_0} w_k \right) - \sum_{h/h_0} \frac{N_h}{n_h} \sum_{k \in h} w_k y_k - \frac{N_{h_0}}{n_{h_0}} \sum_{k/k_0} w_k y_k}{\frac{N_{h_0}}{n_{h_0}} y_{k_0} - \frac{N_{h_0}}{n_{h_0}} \cdot C}$$

where $C = \frac{(1 \pm T) y_{-k_0}}{1 - T^2}$.

Thus, two values arise for $w_{k_0}$, one by selecting the plus sign ("+") in the formula for C and one by selecting the minus sign ("−") in the formula for C. Thus, two candidates will be obtained for the value of the revised weight $w_{k_0}$. Once these two values have been computed, we must determine which value, if any, will be used to replace the existing value of the weight for observation $k_0$. In making this determination, three situations may arise a). Both revised weights $w_{k_0}$ are positive. In this case, choose the one whose value is closer to the original value for the weight for observation $k_0$, mark all observations as feasible, and return to the third step.

b). One revised weight $w_{k_0}$ is positive and one is negative. In this case, choose the positive one, mark all observations as feasible, and return to the third step.

c). Both revised weights $w_{k_0}$ are negative. In this case, retain the current weight, mark this observation as infeasible and return to the third step.

Note that this algorithm stops when either of two conditions arises: one, when no feasible observation is an outlier and all other observations are infeasible, and two when the number of iterations exceeds some user prespecified limit.

As previously emphasized, the fourth step of the method of the present invention may be performed by compensating for statistical outliers, assigned weights, or both to generate more robust population parameter estimates than conventional methods. In the case where both factors are taken into consideration, the fourth step will advantageously eliminate all statistical outliers and adjust the weights so that the impact of the weight of any observation will not exceed the tolerance level specified by the user. Comparatively more robust estimates of the population parameters are then generated by incorporating the revised sample data (adjusted in the sense that outliers have been eliminated and adjusted set of weights) into the formula used to compute the estimate of the population parameter. By computing population parameters, one is able to make statements about the entire population at large, rather than statements regarding the members of the specific sample collected. These more robust parameters may be computed in accordance with the method disclosed in U.S. patent application Ser. No. 09/739,637 (Attorney Docket No. YOR9-9000-0613US1), the contents of which are incorporated herein by reference.

While the invention has been described in terms of a single preferred embodiment, those skilled in the art will recognize that the invention can be practiced with modification within the spirit and scope of the appended claims.

We claim:

1. A method for analyzing survey data, comprising:
   identifying a survey question;
   obtaining a sample from a target population;
   collecting sample responses to the survey questions from respondents in the sample;
   assigning weights to observations corresponding to said responses;
   computing at least one population parameter estimate in accordance with steps that include:
   a) identifying and then eliminating at least one statistical outlier which may skew said at least one population parameter estimate, and
   b) dampening an impact of at least one of the assigned weights on a value of said at least one population parameter estimate.

2. The method of claim 1, wherein said obtaining step includes performing one of probability and non-probability sampling of said target population.

3. The method of claim 1, wherein said assigning step includes assigning said weights so that values of some respondents are assigned greater importance than values of other respondents.

4. The method of claim 1, wherein said at least one population parameter estimate includes one of population mean and population ratio.

5. The method of claim 1, wherein step a) includes:
   determining a size of said sample;
   identifying said statistical outlier based on the size of said sample.

6. The method of claim 5, wherein said step of identifying said statistical outlier based on the size of said sample includes:
   determining whether the size is between a first predetermined number and a second predetermined number, and if so performing a Dixon-type test to identify said statistical outlier.

7. The method of claim 6, wherein said step of identifying said statistical outlier based on the size of said sample includes:
   determining whether the size is greater than a second predetermined number, and if so performing a generalized ESD analysis to identify said statistical outlier.

8. The method of claim 1, wherein step (b) includes;
   identifying responses having at least a predetermined impact on weighted estimates of said population parameter; and adjusting weights to limit sensivitity of said population parameter estimate to within a specified range.

9. The method of claim 1, wherein step (b) includes developing a heuristic which dampens an impact of at least one of the assigned weights on a value of said at least one population parameter estimate, said heuristic developed in accordance with steps that include:

specifying a tolerance condition for impact on said population parameter estimate;

mark all observations as feasible;

if the tolerance condition is satisfied for all observations, not adjusting said weights; and if the tolerance condition is not satisfied, finding a violating observation and computing a revised weight which with a reduced influence.

10. The method of claim 1, wherein in said computing step, step b) includes:

measuring a contribution of any single observation to the value of the population parameter estimate, and ensuring that this contribution does not exceed some user-specified tolerance amount.

11. A method for analyzing survey data, comprising:

identifying a survey question;

obtaining a sample from a target population;

collecting responses to the survey question from respondents in said sample;

assigning weight values to observations corresponding to said responses;

developing a heuristic which reduces skew of an estimate of a population parameter caused by said assigned weight values; and computing an estimate of said population parameter based on said heuristic.

* * * * *